(12) United States Patent
Lee et al.

(10) Patent No.: US 12,456,370 B2
(45) Date of Patent: Oct. 28, 2025

(54) TRAINING METHOD AND SYSTEM FOR OPTIMIZATION OF TRAFFIC SIGNAL

(71) Applicant: ELECTRONICS AND TELECOMMUNICATIONS RESEARCH INSTITUTE, Daejeon (KR)

(72) Inventors: Hun Soon Lee, Daejeon (KR); Moonyoung Chung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 81 days.

(21) Appl. No.: 18/529,479

(22) Filed: Dec. 5, 2023

(65) Prior Publication Data
US 2024/0282194 A1    Aug. 22, 2024

(30) Foreign Application Priority Data
Feb. 20, 2023  (KR) .................. 10-2023-0022081

(51) Int. Cl.
*G08G 1/081*  (2006.01)
*G06N 20/00*  (2019.01)

(52) U.S. Cl.
CPC ............ *G08G 1/081* (2013.01); *G06N 20/00* (2019.01)

(58) Field of Classification Search
CPC .............................. G08G 1/081; G06N 20/00
USPC ........................................................ 340/910
See application file for complete search history.

(56) References Cited

U.S. PATENT DOCUMENTS

| 8,705,499 | B2 | 4/2014 | Shin et al. | |
| 9,818,297 | B2* | 11/2017 | El-Tantawy | G08G 1/083 |
| 11,080,602 | B1* | 8/2021 | Oroojlooyjadid | G06N 3/045 |
| 2010/0153002 | A1 | 6/2010 | Lee et al. | |
| 2022/0076571 | A1* | 3/2022 | Choi | G06V 20/54 |
| 2022/0230540 | A1* | 7/2022 | Howell | G06V 20/54 |
| 2024/0013654 | A1* | 1/2024 | Yoon | G08G 1/08 |

FOREIGN PATENT DOCUMENTS

| KR | 10-2155055 B1 | 9/2020 |
| KR | 10-2493930 B1 | 1/2023 |

OTHER PUBLICATIONS

Hua Wei et al., "IntelliLight: A Reinforcement Learning Approach for Intelligent Traffic Light Control", Research Track Paper, KDD 2018, Aug. 19-23, 2018.

(Continued)

*Primary Examiner* — Kerri L Mcnally
(74) *Attorney, Agent, or Firm* — LRK PATENT LAW FIRM

(57) ABSTRACT

Disclosed is a training method for the optimization of a traffic signal. The method includes segmenting a large-scale road network into intersection groups each including a plurality of intersections, training a reinforcement learning model by allocating a training agent to each intersection group, performing traffic signal control through the inference of an optimal signal based on the trained reinforcement learning model, evaluating whether the results of the execution of the traffic signal control satisfy a preset goal of learning for traffic signal optimization, and repeatedly training the reinforcement learning model based on the results of the evaluation.

14 Claims, 10 Drawing Sheets

(56) References Cited

OTHER PUBLICATIONS

Chacha Chen, et al., "Toward A Thousand Lights: Decentralized Deep Reinforcement Learning for Large-Scale Traffic Signal Control", The Thirty-Fourth AAAI Conference on Artificial Intelligence, Apr. 3, 2020.

\* cited by examiner

INTERSECTION

INTERSECTION GROUP

LARGE-SCALE TRAFFIC NETWORK

TRAINING METHOD AND SYSTEM FOR OPTIMIZATION OF TRAFFIC SIGNAL

CROSS-REFERENCE TO RELATED APPLICATION

This application claims priority to and the benefit of Korean Patent Application No. 10-2023-0022081, filed on Feb. 20, 2023, the disclosure of which is incorporated herein by reference in its entirety.

BACKGROUND

1. Technical Field

The present disclosure relates to a training method and system for the optimization of a traffic signal.

2. Description of Related Art

As a road network (or a road network) becomes complicated and huge and the number of vehicles that travel on the road network is increased, traffic congestion becomes serious. The traffic congestion becomes a cause of an environmental problem, such as an increase of energy consumption or an increase of carbon dioxide emission, in addition to a traffic problem such as a traffic jam or a traffic accident. In order to reduce such traffic congestion and make smooth traffic operation and management, a traffic flow is controlled by installing traffic lights on roads.

To this end, the order and duration of signals that control the driving of vehicles are previously set and used in the traffic lights through the analysis of a traffic situation based on traffic volume data that were collected in the past so that traffic operation and management are smooth. As described above, although a traffic flow is controlled based on a preset signal (i.e., a fixed signal), a situation in which congestion is further increased occurs. Today, about 80% of vehicle delays in cities occur at signalized intersections.

One of causes of such traffic congestion is that a signal that is now applied and operated is a fixed signal based on past traffic volume data, into which a real-time traffic situation that is continuously changed is not incorporated. In order to solve a traffic congestion problem occurring because a real-time traffic situation is not incorporated into the existing fixed signal method, methods of controlling a traffic signal based on a real-time traffic situation are being researched based on reinforcement learning with the help of the development of the machine learning technology.

In this case, if traffic signal control is performed by considering a real-time traffic situation only at some congested intersection in a road network environment, this may reduce traffic congestion in a corresponding area (in the vicinity of an intersection), but may become a cause to increase traffic congestion in another area. Accordingly, it is necessary to reduce congestion of a road network level by performing traffic signal control based on a real-time traffic situation with respect to an extensive area including surrounding intersections connected to an intersection at which traffic congestion has occurred in addition to some areas in which congestion has occurred.

Furthermore, if one reinforcement learning agent performs traffic signal optimization on multiple intersections by using one reinforcement learning model, there may be a problem in that training is not well performed because an action space is increased as the number of target intersections on which traffic signal optimization is to be performed is increased. It is not easy to improve a traffic situation having a large-scale road network level through control of a traffic signal based on the reinforcement learning model due to a balloon effect in which the improvement of a specific area results in a change for the worse in another area and the difficulty of learning attributable to an increase of the action space.

Accordingly, in order to improve traffic flow in a large city through traffic signal considering real-time traffic, there is a need for a scalable traffic signal optimization method based on reinforcement learning, which may also be applied to a large-scale road network.

SUMMARY

Various embodiments are directed to providing a training method and system for the optimization of a traffic signal based on reinforcement learning for a large-scale road network.

However, objects of the present disclosure to be achieved are not limited to the aforementioned object, and other objects may be present.

A training method for the optimization of a traffic signal according to a first aspect of the present disclosure includes segmenting a large-scale road network into intersection groups each including a plurality of intersections, training a reinforcement learning model by allocating a training agent to each intersection group, performing traffic signal control through the inference of an optimal signal based on the trained reinforcement learning model, evaluating whether the results of the execution of the traffic signal control satisfy a preset goal of learning for traffic signal optimization, and repeatedly training the reinforcement learning model based on the results of the evaluation.

Furthermore, a training system for the optimization of a traffic signal according to a second aspect of the present disclosure includes a training controller configured to segment a large-scale road network into intersection groups each including a plurality of intersections, allocate a training agent that is to train a reinforcement learning model for each intersection group, and determine whether the trained reinforcement learning model satisfies a preset goal of learning for traffic signal optimization by performing traffic signal control through an the inference of an optimal traffic signal based on the trained reinforcement learning model, and a plurality of training execution units each configured to train a reinforcement learning model for an intersection group allocated thereto and to repeatedly train the reinforcement learning model when the optimization learning goal is not satisfied.

A computer program according to another aspect of the present disclosure executes the training method for the optimization of a traffic signal, and is stored in a computer-readable recording medium.

Other details of the present disclosure are included in the detailed description and the drawings.

According to an embodiment of the present disclosure, there may be expected an effect in that traffic signal control based on a real-time traffic situation for a large-scale road network is made possible because learning for the optimization of a traffic signal with respect to the large-scale road network is made possible. Accordingly, there is an advantage in that traffic congestion of a large-scale road network can be reduced without a balloon effect.

Effects of the present disclosure which may be obtained in the present disclosure are not limited to the aforementioned effects, and other effects not described above may be evi-

DETAILED DESCRIPTION

Figure 1:
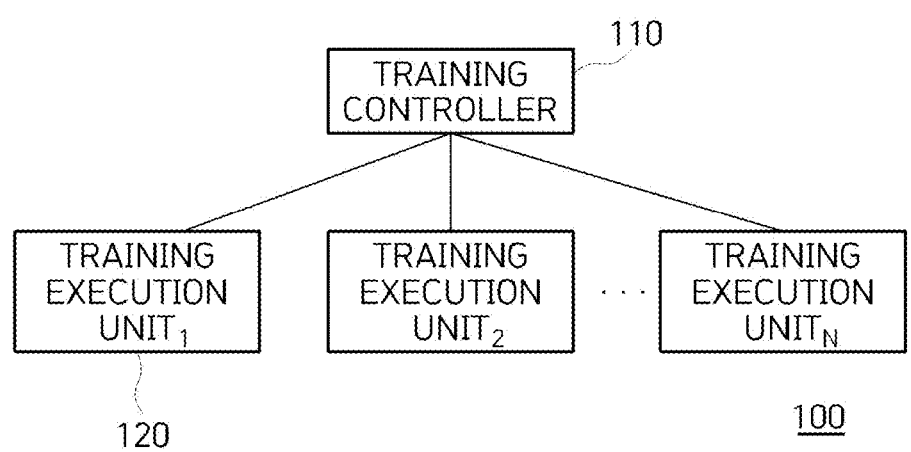
FIG. 1 is a block diagram of a training system for the optimization of a traffic signal according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other components in addition to a mentioned component. Throughout the specification, the same reference numerals denote the same components. "And/or" includes each of mentioned components and all combinations of one or more of mentioned components. Although the terms "first", "second", etc. are used to describe various components, these components are not limited by these terms. These terms are merely used to distinguish between one component and another component. Accordingly, a first component mentioned hereinafter may be a second component within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, in order to help understanding of those skilled in the art, a proposed background of the present disclosure is first described and an embodiment of the present disclosure is then described.

FIG. 1 is a block diagram of a training system 100 for the optimization of a traffic signal according to an embodiment of the present disclosure.

The training system 100 for the optimization of a traffic signal according to an embodiment of the present disclosure includes a training controller 110 and a plurality of training execution units 120.

The training controller 110 segments a large-scale road network into an intersection group including a plurality of intersections, and allocates the training execution unit 120 that will train a reinforcement learning model to each intersection group.

Furthermore, the training controller 110 determines whether a trained reinforcement learning model satisfies a preset optimization learning goal by performing traffic signal control through the inference of an optimal signal based on the trained reinforcement learning model.

In addition, the training controller 110 performs overall control over reinforcement learning for the optimization of a traffic signal.

The training execution unit 120 trains each reinforcement learning model with respect to each intersection group allocated thereto. Furthermore, when a trained reinforcement learning model does not satisfy an optimization learning goal as a result of a determination by the training controller 110, the training execution unit 120 repeatedly trains the reinforcement learning model. In this case, one training execution unit 120 may train several agents.

In an embodiment of the present disclosure, a traffic light at an intersection that belongs to an area not included in a target area in which a traffic signal is to be optimized (i.e., an intersection not included in an intersection group) may be operated according to a fixed signal method based on the past traffic volume data.

Figure 2A:
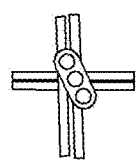
FIGS. 2A to 2C are diagrams for describing a large-scale road network in an embodiment of the present disclosure.
Figure 2B:
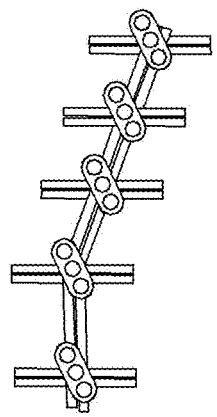
Figure 2C:
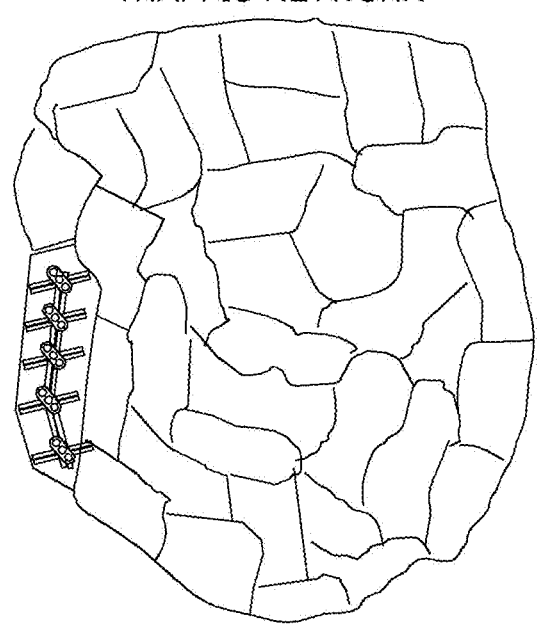

FIGS. 2A to 2C are diagrams for describing a large-scale road network in an embodiment of the present disclosure.

In an embodiment of the present disclosure, a point at which two or more roads meet may be set as an intersection 210 (FIG. 2A). Intersections that mutually affect a traffic flow may be grouped and set as an intersection group 220 (FIG. 2B).

Furthermore, a large-scale road network 230 (FIG. 2C) is constructed to include a plurality of intersection groups.

In general, in order to improve traffic flow, traffic signals at intersections belonging to one intersection group are operated so that the traffic signals operate in conjunction with each other because the traffic signals mutually affect a traffic flow.

In the description of the present disclosure, a piece, an area, and an intersection group are described as having the same concept in which the piece, the area, and the intersection group are generated by segmenting a large-scale road network.

Figure 3:
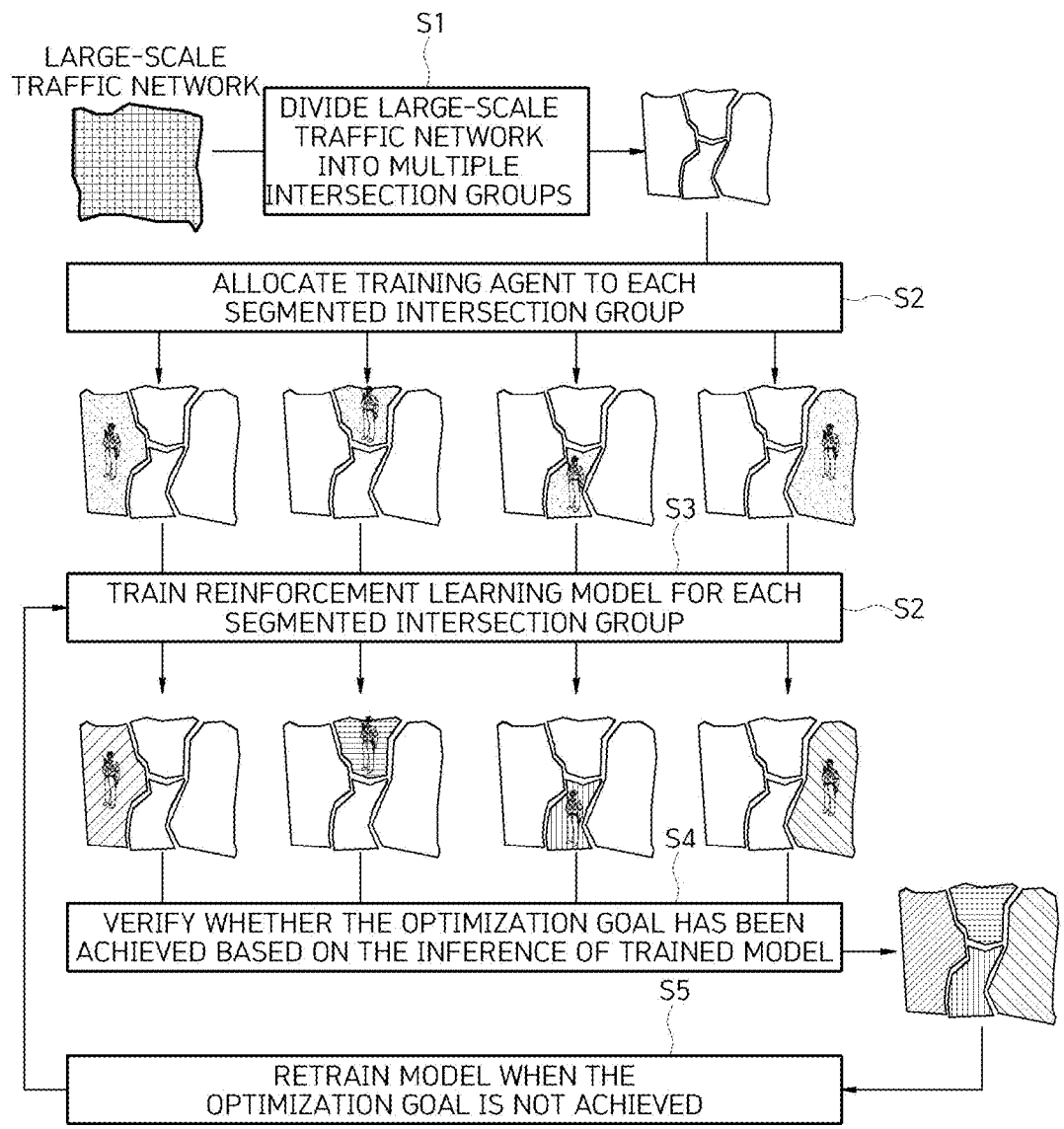
FIG. 3 is a diagram for schematically describing a process of training a reinforcement learning model in an embodiment of the present disclosure.

FIG. 3 is a diagram for schematically describing a process of training a reinforcement learning model in an embodiment of the present disclosure.

As an embodiment, in the training system 100 for the optimization of a traffic signal, first, the training controller 110 segments a large-scale road network into intersection groups, each one being a piece including intersections that mutually affect each other (S1), and allocates each segmented intersection group to a training agent included in the training execution unit 120 (S2) so that a process of training a reinforcement learning model is performed (S3).

Thereafter, the training controller 110 performs a process of evaluating whether the trained reinforcement learning model has achieved an optimization learning goal by performing signal control through the inference of an optimal signal based on the reinforcement learning model on which training has been completed (S4), and controls the training execution unit 120 to repeatedly train a corresponding reinforcement learning model until the corresponding reinforcement learning model achieves the optimization learning goal when the corresponding reinforcement learning model has not achieved the optimization learning goal (S5).

Figure 4:
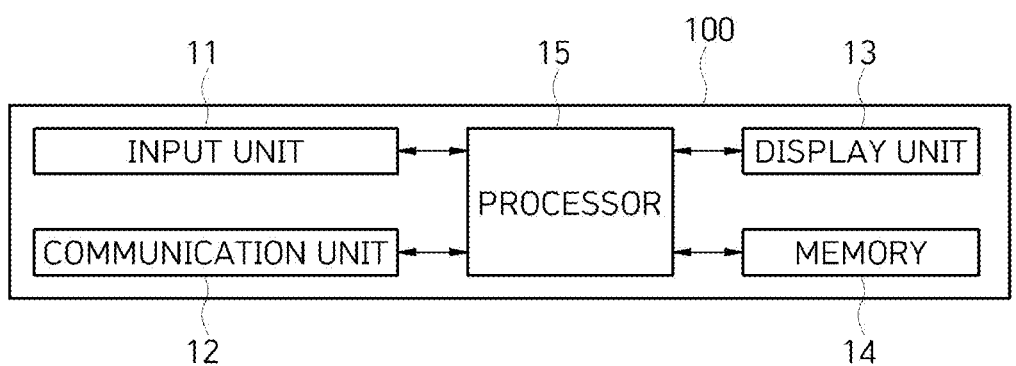
FIG. 4 is a diagram for describing a training system for the optimization of a traffic signal according to an embodiment of the present disclosure.

FIG. 4 is a diagram for describing a training system 100 for the optimization of a traffic signal according to an embodiment of the present disclosure. In this case, in an embodiment of the present disclosure, the training controller 110 and the training execution unit 120 may be constructed as independent server computers and implemented in a form in each of the training controller 110 and the training execution unit 120 includes an input unit, a communication unit, a display unit, memory, and a processor to be described later, or may be implemented in the form of separate programs within one server computer, that is, the training system 100 for the optimization of a traffic signal. Hereinafter, it is assumed that described that the training controller 110 and the training execution unit 120 correspond to the latter case.

The training system 100 for the optimization of a traffic signal according to an embodiment of the present disclosure includes an input unit 11, a communication unit 12, a display unit 13, memory 14, and a processor 15.

The input unit 11 generates input data in response to a user input to the training system 100 for the optimization of a traffic signal. The user input may include a user input relating to data to be processed by the training system 100 for the optimization of a traffic signal. The input unit 11 includes at least one input means. The input unit 11 may include a keyboard, a key pad, a dome switch, a touch panel, a touch key, a mouse, and a menu button.

The communication unit 12 transmits and receives data between the internal components or performs communication with an external device, such as an external server. That is, the communication unit 12 may receive a predetermined image from the external service or device or may transmit and receive other required data. The communication unit 12 may include both a wired communication module and a wireless communication module. The wired communication module may be implemented by using a power line communication device, a telephone line communication device, cable home (MoCA), Ethernet, IEEE1294, an integrated wired home network, or an RS-485 controller. Furthermore, the wireless communication module may be constructed in the form of a module for implementing a function, such as a wireless LAN (WLAN), Bluetooth, a HDR WPAN, UWB, ZigBee, Impulse Radio, a 60 GHz WPAN, Binary-CDMA, a wireless USB technology, a wireless HDMI technology, $5^{th}$ generation (5G) communication, long term evolution-advanced (LTE-A), long term evolution (LTE), or wireless fidelity (Wi-Fi).

The display unit 13 displays display data according to an operation of the training system 100 for the optimization of a traffic signal. The display unit 13 includes a liquid crystal display (LCD), a light emitting diode (LED) display, an organic LED (OLED) display, a micro electro mechanical systems (MEMS) display, and an electronic paper display. The display unit 13 may be implemented as a touch screen by being coupled with the input unit 11.

The memory 14 stores programs that enable optimal signal control to be performed through the training of a reinforcement learning model for a target intersection in a large-scale road network. In this case, the memory 14 collectively refers to nonvolatile storage that continue to retain information stored therein although power is not supplied thereto and volatile storage. For example, the memory 14 may include NAND flash memory, such as a compact flash (CF) card, a secure digital (SD) card, a memory stick, a solid-state drive (SSD), and a micro SD card, magnetic computer storage, such as a hard disk drive (HDD), and optical disc drives, such as CD-ROM and DVD-ROM.

The processor 15 may control at least another component (e.g., a hardware or software component) of the training system 100 for the optimization of a traffic signal by executing software, such as a program, and may perform various data processing or operations.

Hereinafter, a method that is performed by the training system 100 for the optimization of a traffic signal according to an embodiment of the present disclosure is described with reference to FIGS. 5 to 10.

Figure 5:
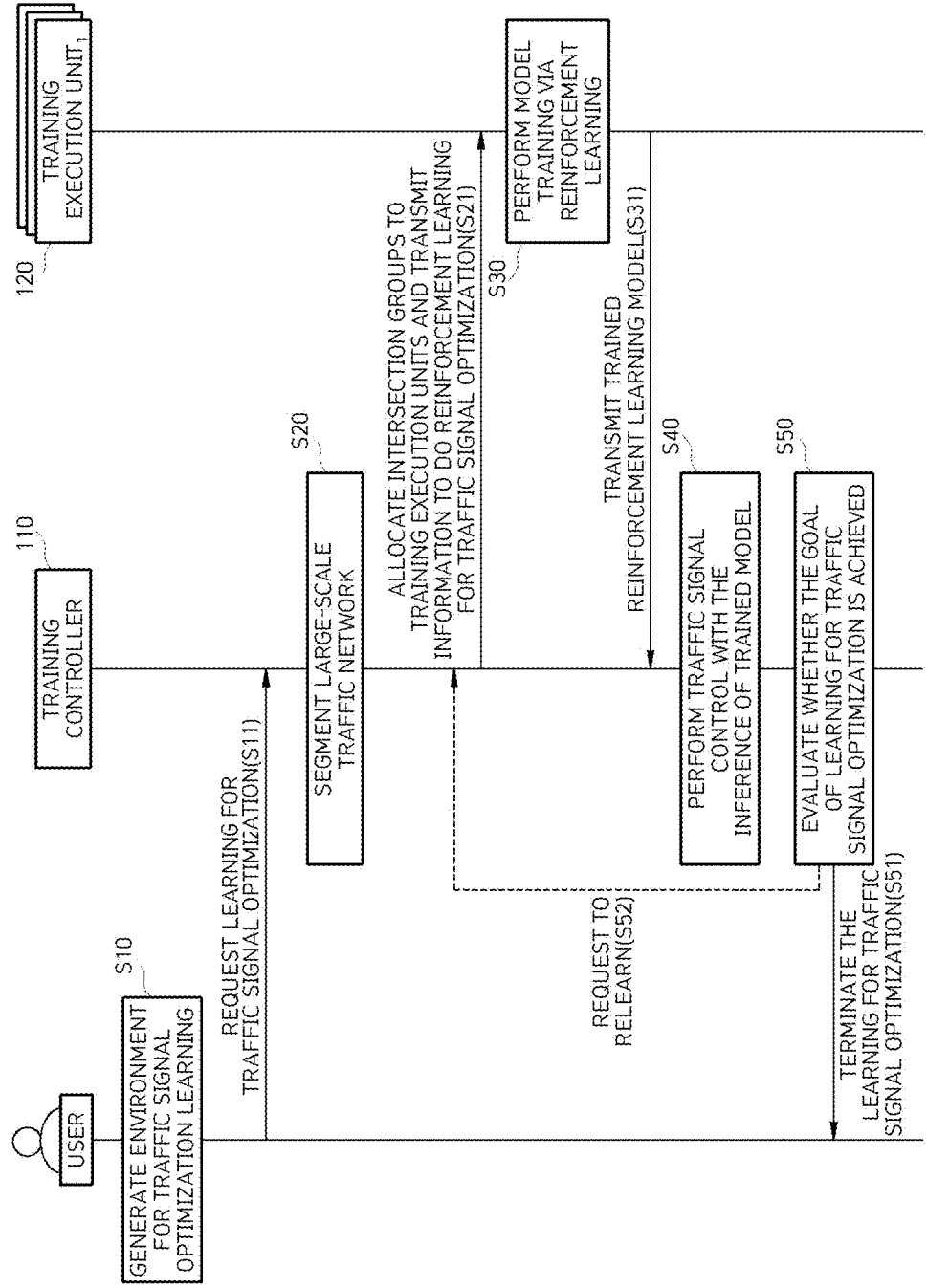
FIG. 5 is a flowchart of a training method for the optimization of a traffic signal according to an embodiment of the present disclosure.

FIG. 5 is a flowchart of a training method for the optimization of a traffic signal according to an embodiment of the present disclosure.

In the training method for the optimization of a traffic signal according to an embodiment of the present disclosure, first, an environment for traffic signal optimization learning is generated by a user (S10). The training controller 110 receives a traffic signal optimization learning request from the user (S11). In this case, the environment for the traffic signal optimization learning may mean an environment including the training controller 110 and the training execution unit 120. In other words, the environment for the traffic signal optimization learning may mean a predetermined configuration for exchanging messages between the training controller 110 and the plurality of training execution units 120.

Furthermore, the traffic signal optimization learning request from the user may include information on a target intersection on which traffic signal optimization is to be performed, among a plurality of intersections that constitute a large-scale road network, information on the execution of traffic signal optimization learning, and an optimization learning goal.

In response to the traffic signal optimization learning request, the training controller 110 segments a large-scale road network into intersection groups each including a plurality of intersections (S20). In this case, the training controller 110 may segment the large-scale road network into a plurality of intersections groups, each one including intersections that mutually affect a traffic flow.

As an embodiment, the training controller 110 may segment a large-scale road network by applying a first segmentation method of segmenting a plurality of intersections that constitute the large-scale road network into intersection groups that are constructed by grouping intersections that mutually affect a traffic flow for an efficient signal operation in the existing fixed signal method.

As another embodiment, the training controller 110 may segment a large-scale road network by applying a second segmentation method of segmenting intersections according to predetermined priority into groups on the basis of a degree of vehicle congestion in each intersection by analyzing a traffic congestion situation in each intersection with respect to a plurality of intersections that constitute the large-scale road network or grouping intersections that together generate a traffic congestion situation as one group.

Next, the training controller 110 allocates the intersection groups to the training execution units 120, respectively (S21). The training execution unit 120 trains a reinforcement learning model with respect to the intersection group allocated thereto (S30).

In this case, the training controller 110 may request the execution of the traffic signal optimization learning by transmitting information necessary for the traffic signal optimization learning to the training execution unit 120. The information necessary for the traffic signal optimization learning may include information on an intersection group on which training will be performed, a state, an action, reward, an interval how often trained model will be stored, and the number of optimal model candidates. For example, the state may be a state that is classified based on a plurality of directions of passage in an intersection and the number of vehicles that wait in each direction of passage. The action may be an action to set a green signal time within a predetermined range with respect to a specific state. The reward may be a reward that is determined based on the average waiting time of vehicles in an intersection.

Furthermore, the information necessary for the traffic signal optimization learning may further include whether a pre-trained reinforcement learning model will be used for inference or learning in the case of re-training or information (e.g., a storage location) on a trained model.

The information necessary for the traffic signal optimization learning may be determined based on information that is accompanied when a user makes a traffic signal optimization learning request.

The training controller 110 may allocate one intersection group to one training execution unit 120, but the present disclosure is not essentially limited thereto. The training controller 110 may allocate a plurality of intersection groups to one training execution unit 120.

Next, the training execution unit 120 transmits the trained reinforcement learning model, that is, the results of the execution of the traffic signal optimization learning, to the training controller 110 (S31). In this case, the training execution unit 120 may transmit the trained reinforcement learning model by using a shared storage (e.g., a file system) which may be accessed by the training execution unit 120 along with the training controller 110.

Next, the training controller 110 performs signal control through the inference of an optimal traffic signal using the reinforcement learning model received from the training execution unit 120 (S40), and evaluates whether the results of the execution of the traffic signal control satisfy a preset optimization learning goal (S50). When the results of the evaluation of the traffic signal control satisfy the optimization learning goal, the training controller 110 terminates the traffic signal optimization learning (S51).

However, when the results of the evaluation of the traffic signal control do not satisfy the optimization learning goal, the training controller 110 requests additional repetition training for a reinforcement learning model from a corresponding training execution unit 120 (S52). Accordingly, the training execution unit 120 performs training on the reinforcement learning model (S30) based on information necessary for traffic signal optimization learning, which is received from the training controller 110 again (S21).

In an embodiment of the present disclosure, the preset optimization learning goal may be set based on various indices on which a degree of reduced traffic congestion can be estimated, for example, an intersection passing time reduction rate, an intersection waiting time reduction rate of a vehicle, a vehicle speed increase rate on a road, and a travel time reduction rate up to a destination.

Figure 6:
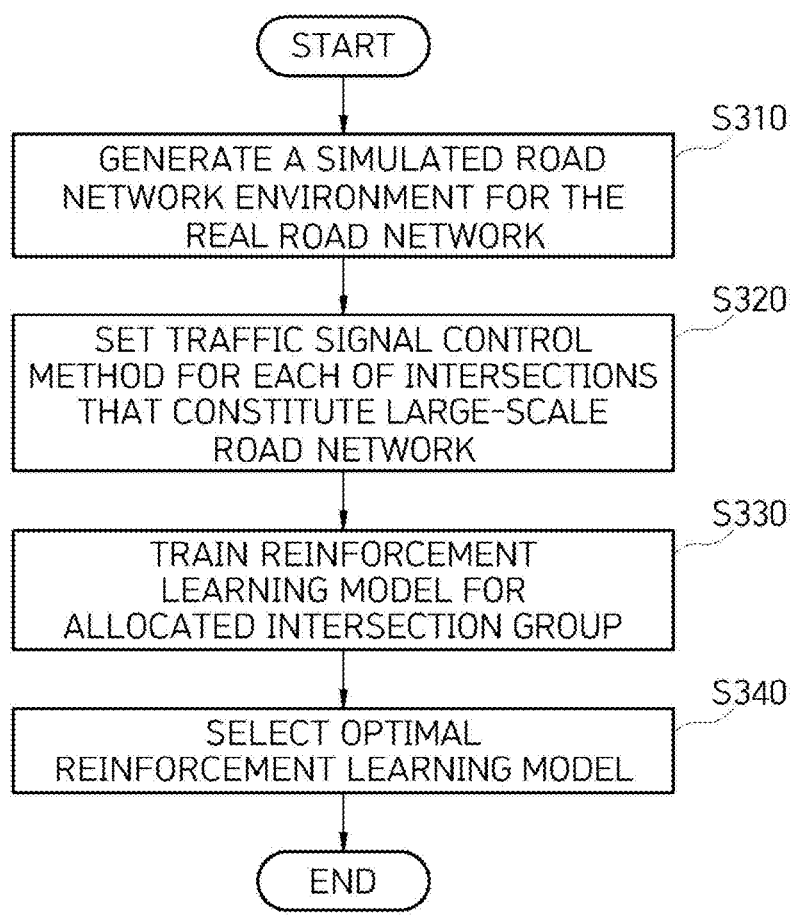
FIG. 6 is a diagram illustrating a detailed embodiment of a process of training a reinforcement learning model in an embodiment of the present disclosure.

FIG. 6 is a diagram illustrating a detailed embodiment of a process of training a reinforcement learning model in an embodiment of the present disclosure.

Step S30 in FIG. 5 is described more specifically. First, for the execution of traffic signal optimization learning, the training execution unit 120 generates a simulated road network environment for the real road network (S310). Various problems, such as traffic congestion and a civil complaint according to congestion and so on, are present when reinforcement learning is performed with a real-world traffic environment. Accordingly, in an embodiment of the present disclosure, the training of a reinforcement learning model may be performed by using a simulated traffic environment (i.e., a traffic simulator, for example, SUMO).

As an embodiment, the simulated road network environment receives a traffic scenario as an input including a road network (e.g., road connection information), a traffic signal, and a traffic demand (e.g., a vehicle moving path), and provides traffic simulations that simulate a real-world traffic environment.

After operating in conjunction with the simulated road network environment, the training execution unit 120 sets a traffic signal control method upon execution of traffic signal optimization learning for intersections that constitute a large-scale road network (S320).

Next, the training execution unit 120 trains a reinforcement learning model for an intersection group allocated thereto by using the simulated road network environment (S330).

As an embodiment, the training execution unit 120 performs the training of a reinforcement learning model for traffic signal optimization through a series of processes, including the collection of information on the state of an intersection group being in charge of the training execution unit 120, the prediction and application of an action, and the calculation of a reward, by using the associated simulated road network environment.

In this case, the training execution unit 120 may collect all of pieces of reward information in a corresponding cycle every learning cycle (or epoch), and may store a reinforcement learning model on which the training has been completed every predetermined storing interval. In this case, the interval means an interval how often trained model will be stored included in the information (S21) necessary for the traffic signal optimization learning.

In the step of training the reinforcement learning model, one reinforcement learning model may be trained for each intersection group or every intersection.

Next, when the training of the reinforcement learning model is completed, the training execution unit 120 selects an optimal reinforcement learning model based on the reward information (S340).

Figure 7:
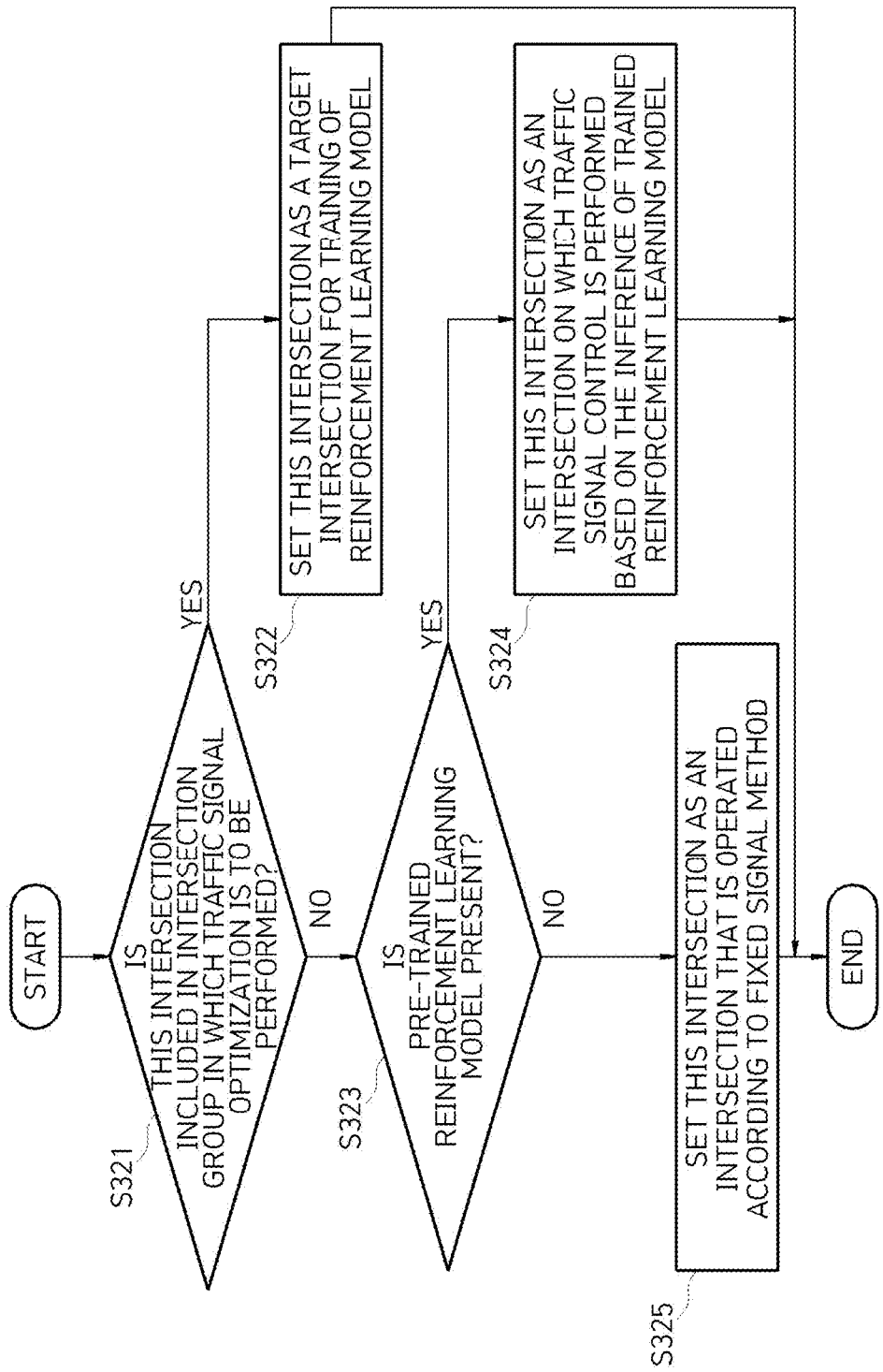
FIG. 7 is a diagram for more specifically describing a step of controlling a traffic signal in an embodiment of the present disclosure.

FIG. 7 is a diagram for more specifically describing the step S320 of controlling a traffic signal in an embodiment of the present disclosure.

In step S320, the training execution unit 120 may set a traffic signal control method when performing traffic signal optimization learning with respect to all intersections of a large-scale road network according to the following criteria.

First, the training execution unit 120 determines whether which one intersection, among all the intersections of the large-scale road network, belongs to an intersection group allocated thereto so that the intersection group is responsible for the execution of traffic signal optimization (S321). When the intersection belongs to the allocated intersection group that is an optimization target as a result of the determination, the training execution unit 120 sets the intersection as a target intersection for the training of a reinforcement learning model (S322).

However, when the intersection does not belong to the allocated intersection group that is an optimization target as a result of the determination, the training execution unit 120 determines whether a reinforcement learning model trained in accordance with the intersection for traffic signal control is present based on information necessary for traffic signal optimization learning, which is received from the training controller 110 (S323). When the trained reinforcement learning model is present as a result of the determination, the training execution unit 120 may set the intersection as an intersection on which traffic signal control is performed based on the inference of the trained reinforcement learning model (S324).

However, when the trained reinforcement learning model is not present as a result of the determination, the training controller 110 may set the intersection as an intersection that is operated according to a fixed signal method (S325).

Figure 8:
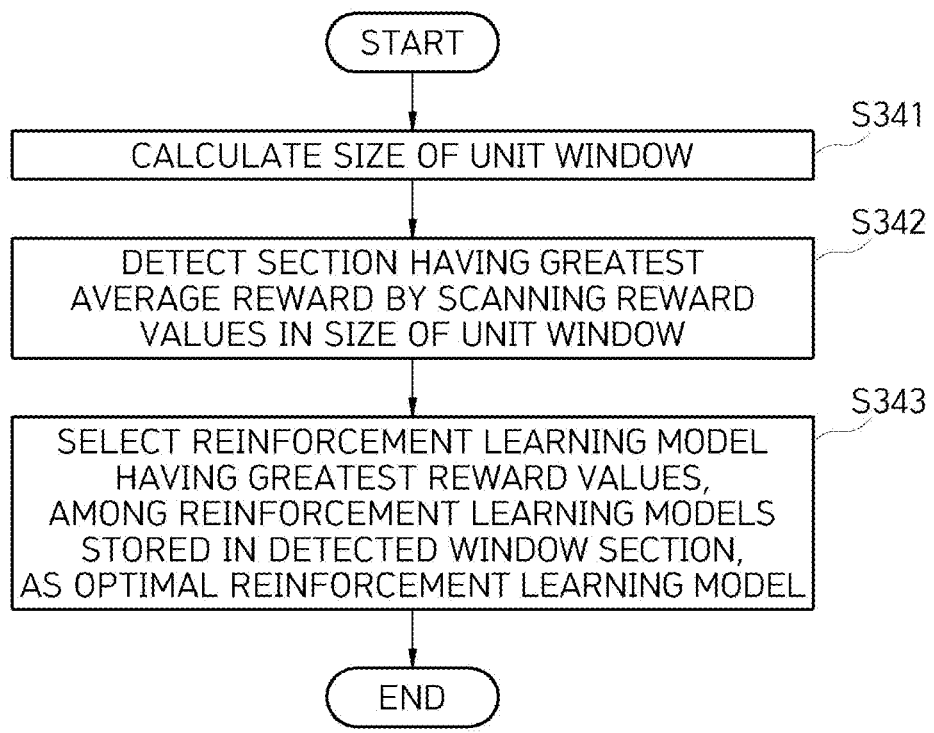
FIG. 8 is a diagram for more specifically describing a step of selecting an optimal reinforcement learning model in an embodiment of the present disclosure.
Figure 9:
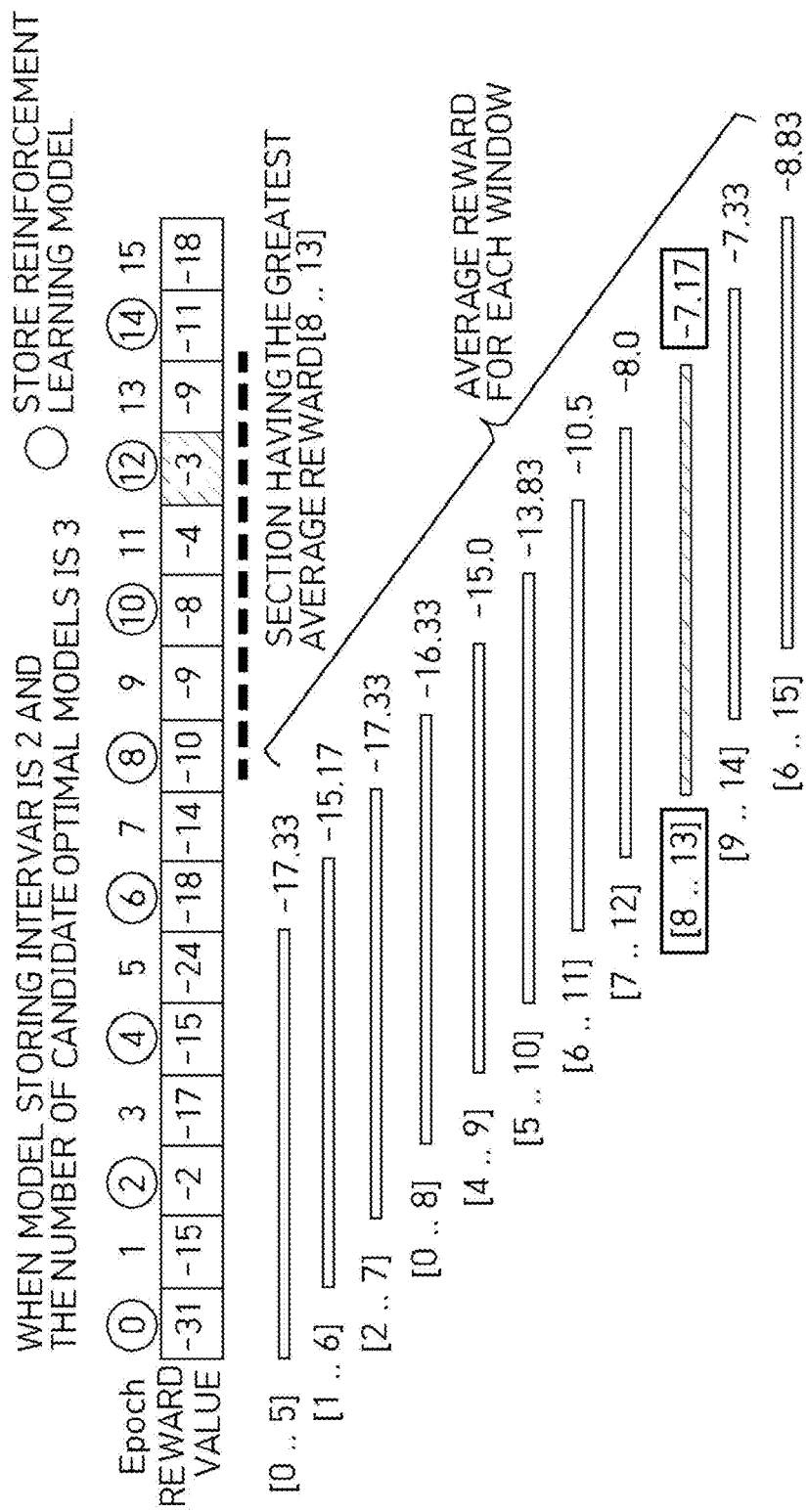
FIG. 9 is a diagram illustrating an example of a step of selecting an optimal reinforcement learning model in an embodiment of the present disclosure.

FIG. 8 is a diagram for more specifically describing the step S340 of selecting an optimal reinforcement learning model in an embodiment of the present disclosure. FIG. 9 is a diagram illustrating an example of the step S340 of selecting an optimal reinforcement learning model in an embodiment of the present disclosure.

The training execution unit 120 may select an optimal reinforcement learning model, among reinforcement learning models that have been stored in a predetermined cycle in a reinforcement learning process, by considering a model storing interval by analyzing reward information for each epoch (i.e., all the reinforcement learning models are trained at once), which is collected in the reinforcement learning process.

To this end, the training execution 120 selects the size of a unit window for the analysis of the reward information (S341). In this case, the size of the unit window is calculated as the product of the storing interval of a reinforcement learning model included in information necessary for traffic signal optimization learning and the number of candidate reinforcement learning models. The calculated size of the unit window is used as the unit of a size for analyzing reward information of the reinforcement learning model. The storing interval of the reinforcement learning model and the number of candidate reinforcement learning models may be determined based on a value that is set by a user when the user first makes a traffic signal optimization learning request.

Next, the training execution unit 120 detects a section having the greatest average reward in a window section by scanning reward values, corresponding to reward information collected every learning cycle, in the size of the unit window (S342).

Next, the training execution unit 120 may select a reinforcement learning model having the greatest reward value, among reinforcement learning models stored in the detected section, as an optimal reinforcement learning model (S343).

Referring to FIG. 9, it is assumed that reward information (or reward values) collected every learning cycle (i.e., an epoch) while reinforcement learning is performed) are [−31, −15, −2, −17, −15, −24, −18, −14, −10, −9, −8, −4, −3, −9, −11, −18], a reinforcement learning model storing interval is 2, and the number of candidate reinforcement learning models is 3. In this case, the size of a unit window to be analyzed is 6, that is, the product of the reinforcement learning model storing interval and the number of candidate reinforcement learning models.

When average rewards are calculated for each size of a unit window by scanning the collected reward values while making the rounds of the collected reward values in the size of the unit window and are compared, a unit window section having the greatest average reward value is a section from Epoch 8 to Epoch 13. The training execution unit 120 selects, as an optimal reinforcement learning model, a candidate reinforcement learning model stored in Epoch 12 having the greatest reward value by comparing reward values of Epoch 8, Epoch 10, and Epoch 12, that is, epochs in which the candidate reinforcement learning models are stored in the corresponding section.

Figure 10:
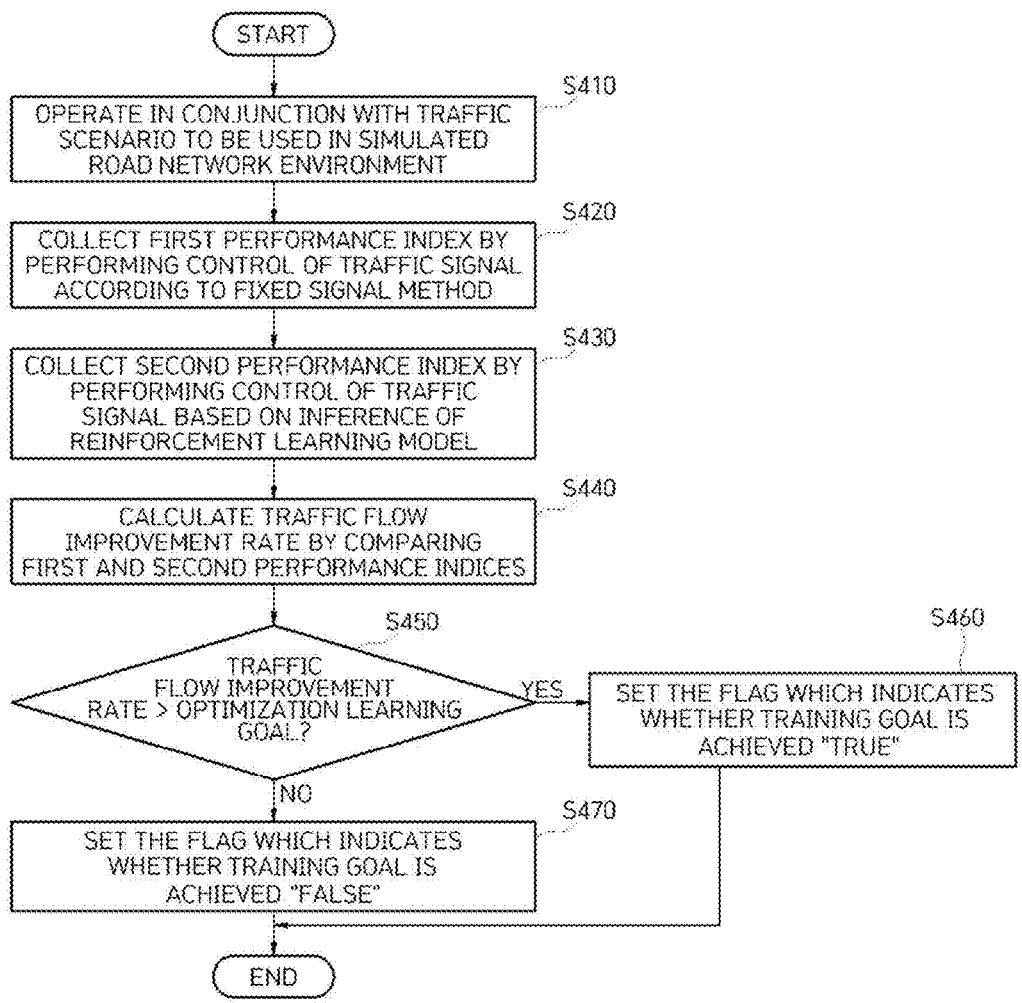
FIG. 10 is a diagram for more specifically describing a step of verifying whether a training goal is achieved by using a trained reinforcement learning model in an embodiment of the present disclosure.

FIG. 10 is a diagram for more specifically describing the steps S40 and S50 of verifying whether a training goal is achieved by using a trained reinforcement learning model in an embodiment of the present disclosure.

In order to verify whether a trained reinforcement learning model satisfies a preset traffic signal optimization learning goal, the training controller 110 first operates in conjunction with a traffic scenario to be used in a road network environment simulated from a large-scale road network (S410).

After operating in conjunction with the traffic scenario, the training controller 110 collects a predetermined first performance index by performing control of a traffic signal according to a fixed signal method (S420).

Furthermore, after operating in conjunction with the traffic scenario, the training controller 110 collects a predetermined second performance index by performing control of a traffic signal based on the inference of the trained reinforcement learning model (S430).

Next, the training controller 110 calculates a traffic flow improvement rate based on the results of a comparison between the first and second performance indices (S440), and determines whether the traffic flow improvement rate satisfies an optimization learning goal (S450).

When the traffic flow improvement rate satisfies the optimization learning goal as a result of the determination, the training controller 110 sets the flag which indicates whether training goal is achieved "true" (S460). When the traffic flow improvement rate does not satisfy the optimization learning goal as a result of the determination, the training controller 110 sets the flag which indicates whether training goal is achieved "false" (S470).

In an embodiment of the present disclosure, when the optimization learning goal is not achieved, the training controller 110 may perform the re-training of the reinforcement learning model. In this case, when whether the optimization learning goal is achieved is verified, a process of collecting the first performance index in the fixed signal method in step S420 may be omitted because the first performance index that has already been collected may be used.

When the optimization learning goal is not achieved, the training controller 110 requests the training execution unit 120 to re-train the reinforcement learning model.

In this case, in an embodiment of the present disclosure, the re-training may be performed in an accumulated training form. In an embodiment of the present disclosure, the accumulated training means that a reinforcement learning model is not trained again from the beginning, but is trained based on a reinforcement learning model that has been trained in previous training. When reinforcement learning for the signal optimization of a corresponding area (i.e., an intersection group) allocated to this end is performed, a candidate reinforcement learning model that has been last stored may be loaded, and the training of the loaded candidate reinforcement learning model may be repeatedly performed.

Furthermore, in an embodiment of the present disclosure, if replay memory is used in order to update a reinforcement learning model, the training execution unit 120 may also store the replay memory when traffic signal optimization learning is terminated, may load the stored replay memory when a re-training execution request is made, and may use the loaded replay memory to update the reinforcement learning model.

The information necessary for the traffic signal optimization learning may also include information on whether accumulated training will be performed and whether replay memory has been stored.

In the aforementioned description, steps S10 to S50, S310 to S340, S321 to S325, S341 to S343, and S410 to S470 may be further divided into additional steps or the steps may be combined into smaller steps depending on an implementation example of the present disclosure. Furthermore, some of the steps may be omitted, if necessary, and the sequence of the steps may be changed. Furthermore, although contents are omitted, the contents described with reference to FIGS. 1 to 4 and the contents described with reference to FIGS. 5 to 10 may be mutually applied.

The training method for the optimization of a traffic signal may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The medium in which the method is stored means a medium that semi-permanently stores data and that is readable by a device, not a medium that stores data for a short moment like a register, a cache, or memory. Specifically, examples of the medium in which the method is stored include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, components described in the singular form may be carried out in a distributed form. Likewise, components described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A training method for an optimization of a traffic signal, comprising:
   segmenting a large-scale road network into intersection groups each comprising a plurality of intersections;
   training a reinforcement learning model by allocating a training agent to each intersection group;
   performing traffic signal control through an inference of an optimal traffic signal based on the trained reinforcement learning model;
   evaluating whether results of the execution of the traffic signal control satisfy a preset goal of learning for traffic signal optimization; and
   repeatedly training the reinforcement learning model based on results of the evaluation,
   wherein the segmenting of the large-scale road network into the intersection groups comprises segmenting the large-scale road network by applying at least one of a first segmentation method of segmenting a plurality of intersections that constitute the large-scale road network into intersection groups that are operated according to a fixed traffic signal method and a second segmentation method of segmenting intersections according to predetermined priority into intersection groups on the basis of a degree of vehicle congestion in each intersection.

2. The training method of claim 1, further comprising receiving a traffic signal optimization learning request from a user, wherein the traffic signal optimization learning request comprises information on a target intersection on which traffic signal optimization is to be performed, among a plurality of intersections constituting the large-scale road network, information on an execution of traffic signal optimization learning, and the optimization learning goal.

3. The training method of claim 1, wherein the training of the reinforcement learning model by allocating the training agent to each intersection group comprises:
  generating a simulated road network environment for the real road network;
  setting a traffic signal control method upon execution of traffic signal optimization learning with respect to each of the intersections that constitute the large-scale road network;
  training a reinforcement learning model for the allocated intersection group by using the simulated road network environment; and
  selecting an optimal reinforcement learning model based on reward information when the training of the reinforcement learning model is completed.

4. The training method of claim 3, wherein the training of the reinforcement learning model for the allocated intersection group by using the simulated road network environment comprises:
  collecting all of pieces of reward information in a corresponding cycle every learning cycle; and
  storing the reinforcement learning model on which the training has been completed every predetermined storing interval.

5. The training method of claim 4, wherein the selecting of the optimal reinforcement learning model based on the reward information when the training of the reinforcement learning model is completed comprises:
  calculating a size of a unit window for analyzing the reward information;
  detecting a section having the greatest average reward in a window section by scanning reward values corresponding to the reward information collected every learning cycle in the size of the unit window; and
  selecting a reinforcement learning model stored in a learning cycle having a greatest reward value, among reinforcement learning models stored in the detected section, as the optimal reinforcement learning model.

6. The training method of claim 5, wherein the calculating of the size of the unit window for analyzing the reward information comprises:
  calculating the size of the unit window based on a storing interval of the reinforcement learning model and the number of candidate reinforcement learning models.

7. The training method of claim 4, wherein the repeatedly training of the reinforcement learning model based on the results of the evaluation comprises:
  loading a candidate reinforcement learning model that has been last stored; and
  repeatedly performing the training of the loaded candidate reinforcement learning model.

8. The training method of claim 3, wherein the training of the reinforcement learning model for the allocated intersection group by using the simulated road network environment comprises training one reinforcement learning model for each intersection group or every intersection.

9. The training method of claim 3, wherein the generating of the simulated road network environment that is simulated from the large-scale road network comprises providing the simulated road network through traffic simulations based on a traffic scenario as an input comprising road network information, traffic signal information, and traffic demand information.

10. The training method of claim 3, wherein the setting of the traffic signal control method upon execution of the traffic signal optimization learning with respect to each of the intersections that constitute the large-scale road network comprises:
  determining whether any one intersection of the large-scale road network belongs to the allocated optimization target intersection group; and
  selecting the any one intersection as a target intersection for the training of the reinforcement learning model when the any one intersection belongs to the allocated optimization target intersection group.

11. The training method of claim 10, wherein the setting of the traffic signal control method upon execution of the traffic signal optimization learning with respect to each of the intersections that constitute the large-scale road network comprises:
  determining whether a reinforcement learning model trained in accordance with a corresponding intersection is present when the any one intersection does not belong to the allocated optimization target intersection group as a result of the determination; and
  setting the any one intersection as an intersection on which traffic signal optimization is performed by an inference of the trained reinforcement learning model when the reinforcement learning model trained in accordance with the corresponding intersection is present as a result of the determination.

12. The training method of claim 11, wherein the setting of the traffic signal control method upon execution of the traffic signal optimization learning with respect to each of the intersections that constitute the large-scale road network comprises setting the corresponding intersection as an intersection that is operated according to a fixed traffic signal method when the reinforcement learning model trained in accordance with the corresponding intersection is not present as a result of the determination.

13. The training method of claim 1, wherein the evaluating of whether the results of the execution of the traffic signal control satisfy the preset goal of learning for traffic signal optimization learning goal comprises:
  operating a traffic scenario to be used in the simulated road network environment simulated from the large-scale road network in conjunction with the simulated road network environment;
  collecting a predetermined first performance index by performing control of a traffic signal according to a fixed traffic signal method after operating the traffic scenario in conjunction with the simulated road network environment;
  collecting a predetermined second performance index by performing control of a traffic signal based on an inference of the trained reinforcement learning model after operating the traffic scenario in conjunction with the simulated road network environment;
  calculating a traffic flow improvement rate based on results of a comparison between the first and second performance indices; and
  determining whether the traffic flow improvement rate satisfies the optimization learning goal.

14. A training system for an optimization of a traffic signal, comprising:
  a training controller configured to segment a large-scale road network into intersection groups each comprising a plurality of intersections, allocate a training agent that is to train a reinforcement learning model for each intersection group, and determine whether the trained reinforcement learning model satisfies a preset goal of learning for traffic signal optimization learning goal by performing traffic signal control through an inference of an optimal traffic signal based on the trained reinforcement learning model; and a plurality of training execution units each configured to train a reinforcement learning model for an intersection group allocated thereto and to repeatedly train the reinforcement learning model when the optimization learning goal is not satisfied, wherein the segmentation of the large-scale road network into the intersection groups is performed by applying at least one of a first segmentation method of segmenting a plurality of intersections that constitute the large-scale road network into intersection groups that are operated according to a fixed traffic signal method and a second segmentation method of segmenting intersections according to predetermined priority into intersection groups on the basis of a degree of vehicle congestion in each intersection.

* * * * *